United States Patent [19]

Weiss et al.

[11] Patent Number: 5,120,699
[45] Date of Patent: Jun. 9, 1992

[54] PLATINUM-ON-GRAPHITE CATALYSTS AND THE USE THEREOF

[75] Inventors: Franz-Josef Weiss, Neuhofen; Hugo Fuchs, Ludwigshafen; Werner Steigleiter, Limburgerhof; Wolfgang Hoelderich, Frankenthal; Luc Guns, Mannheim; Gerald Neubauer, Weinheim; Josef Ritz, Ludwigshafen, all of Fed. Rep. of Germany

[73] Assignee: BASF Aktiengesellschaft, Ludwigshafen, Fed. Rep. of Germany

[21] Appl. No.: 730,758

[22] Filed: Jul. 16, 1991

[30] Foreign Application Priority Data

Jul. 18, 1990 [DE] Fed. Rep. of Germany ...... 4022853

[51] Int. Cl.⁵ .................... B01J 21/18; B01J 23/42
[52] U.S. Cl. .................................................. 502/185
[58] Field of Search ........................................ 502/185

[56] References Cited

U.S. PATENT DOCUMENTS

| 2,823,101 | 2/1958 | Jockers et al. | |
|---|---|---|---|
| 3,663,166 | 5/1971 | Weise et al. | 502/185 X |
| 3,996,165 | 12/1976 | El-Ghatta et al. | 502/185 |
| 4,052,336 | 10/1977 | van Montfoort et al. | 502/185 |
| 4,158,047 | 6/1979 | van de Moesdijk et al. | 502/185 X |
| 4,404,176 | 9/1983 | Grosskinsky et al. | 423/387 |
| 4,659,686 | 4/1987 | Griffiths et al. | 502/183 |
| 4,794,054 | 12/1988 | Ito et al. | 429/44 |
| 4,889,704 | 12/1989 | Fuchs et al. | 502/185 X |
| 4,895,711 | 1/1990 | Biffar et al. | 423/387 |
| 4,992,252 | 2/1991 | Ichikashi et al. | 423/387 |

FOREIGN PATENT DOCUMENTS

| 0008479 | 3/1980 | European Pat. Off. | 502/185 |
|---|---|---|---|
| 2447972 | 4/1975 | Fed. Rep. of Germany | 502/185 |
| 7902291 | 9/1980 | Netherlands | 502/185 |
| 0316468 | 10/1971 | U.S.S.R. | 502/185 |

OTHER PUBLICATIONS

Katalytische Hydrierungen im organisch chemischen Laboratorium, F. Zimalkowski Ferdinand Enke Verlag, Stuttgart (1965).
Structure of Metallic Catalysts, Anderson, Academic Press (1975).

*Primary Examiner*—W. J. Shine
*Assistant Examiner*—Douglas J. McGinty
*Attorney, Agent, or Firm*—Keil & Weinkauf

[57] ABSTRACT

A platinum-on-graphite catalyst having a platinum content of from 0.01 to 5% w/w, wherein the graphite support has a particle size of from 1 to 600 $\mu$m and the following particle size distribution:

| 183 to 600 $\mu$m | 15% v/v ± 15% absolute |
|---|---|
| 68.3 to 183 $\mu$m | 30% v/v ± 20% |
| 31.0 to 68.3 $\mu$m | 25% v/v ± 20% |
| 17.1 to 31.0 $\mu$m | 15% v/v ± 10% |
| 5.2 to 17.1 $\mu$m | 12% v/v ± 10% |
| <5.2 $\mu$m | 5% v/v ± 5%. |

6 Claims, No Drawings

PLATINUM-ON-GRAPHITE CATALYSTS AND THE USE THEREOF

Suitable catalysts for the hydrogenation of organic and inorganic compounds are noble metals, such as palladium, platinum and ruthenium, deposited on various supports, such as silicon dioxide, aluminum oxide, graphite and activated charcoal, as has been described in "*Katalytische Hydrierungen im organisch chemischen Laboratorium*" F. Zimalkowski, Ferdinand Enke Verlag, Stuttgart (1965).

An important factor influencing the activity of such catalysts is the high degree of dispersion of the noble metal on the catalyst support. As disclosed in "*Structure of Metallic Catalysts*" J. F. Anderson, Academic Press (1975) pp. 164 et seq., the conditions used for the reaction and agglomeration can cause an increase in the particle size of the deposited noble metal and a decrease in the degree of dispersion and also detachment of the noble metal from the supporting material.

DE-PS 956,038 describes platinum-on-graphite catalysts which are produced by precipitating platinum onto a suspended graphite support, optionally together with poisoning agents such as compounds containing sulfur, selenium, arsenic or tellurium. Such catalysts are suitable, for example, for the catalytic hydrogenation of nitrogen oxide to hydroxylammonium salts in the presence of aqueous mineral acids, but they suffer from the drawbacks of loss of activity after prolonged use and a tendency to cause undue formation of by-products. In particular, their catalytic activity varies from batch to batch.

It is thus an object of the present invention to provide platinum-on-graphite catalysts which have a long useful life, show little variation in catalytic activity from batch to batch and give rise to good selectivity and a high space-time yield in hydrogenation reactions.

This object is achieved by a platinum-on-graphite catalyst having a platinum content of from 0.01 to 5% w/w, wherein the graphite support has a particle size of from 1 to 600 μm and the following particle size distribution:

| | |
|---|---|
| 183 to 600 μm | 15% v/v ± 15% absolute |
| 68.3 to 183 μm | 30% v/v ± 20% |
| 31.0 to 68.3 μm | 25% v/v ± 20% |
| 17.1 to 31.0 μm | 15% v/v ± 10% |
| 5.2 to 17.1 μm | 12% v/v ± 10% |
| <5.2 μm | 5% v/v ± 5%. |

The invention also relates to the use of a platinum-on-graphite catalyst, in which the graphite support has a particle size of from 1 to 600 μm and the following particle size distribution:

| | |
|---|---|
| 183 to 600 μm | 15% v/v ± 15% absolute |
| 68.3 to 183 μm | 30% v/v ± 20% |
| 31.0 to 68.3 μm | 25% v/v ± 20% |
| 17.1 to 31.0 μm | 15% v/v ± 10% |
| 5.2 to 17.1 μm | 12% v/v ± 10% |
| <5.2 μm | 5% v/v ± 5%. | as a hydrogenation catalyst.

The platinum-on-graphite catalysts of the invention have the advantage that changes therein occur more slowly and their useful life is thus prolonged and that they give rise to good selectivity and a high spacetime yield in hydrogenation reactions. Another advantage is that they require regeneration less often, which reduces the consumption of chemicals and the loss of platinum. Finally, the novel catalysts have the advantage of having a uniform and high degree of activity.

The platinum-on-graphite catalysts of the invention have a platinum content of from 0.01 to 5% w/w, preferably from 0.01 to 2.5% w/w and more preferably from 0.1 to 1% w/w, based on the total weight of platinum and graphite support. The platinum is generally applied to the surface of the graphite support and is present substantially in the form of metallic platinum. Advantageously, platinum is applied to the surface of the graphite in fine distribution, for example by precipitating metallic platinum from a solution onto graphite support material suspended therein.

According to one advantageous feature of the invention, the graphite support has a BET surface area of from 1 to 30 m$^2$/g, preferably from 1 to 15 m$^2$/g and more preferably from 3 to 8 m$^2$/g.

In general, the graphite support is present in suspendable form, and a particle size of from 1 to 600 μm gives good results. The particle size distribution deviates from the Gauss distribution curve and is made up as follows:

| | |
|---|---|
| 183 to 600 μm | 15% v/v ± 15% absolute |
| 68.3 to 183 μm | 30% v/v ± 20% |
| 31.0 to 68.3 μm | 25% v/v ± 20% |
| 17.1 to 31.0 μm | 15% v/v ± 10% |
| 5.2 to 17.1 μm | 12% v/v ± 10% |
| <5.2 μm | 5% v/v ± 5%. |

The following particle size distribution is particularly advantageous:

| | |
|---|---|
| 183 to 600 μm | 15% v/v ± 5% absolute |
| 68.3 to 183 μm | 30% v/v ± 10% |
| 31.0 to 68.3 μm | 25% v/v ± 10% |
| 17.1 to 31.0 μm | 15% v/v ± 5% |
| 5.2 to 17.1 μm | 12% v/v ± 5% |
| <5.2 μm | 5% v/v ± 3%. |

Of course, the actual percentages of the various proportions total 100.

Other advantageous features of the graphite support are an apparent density of from 1.7 to 2.2 g/ml, especially from 1.73 to 1.95 g/ml, and a compressive strength of from 50 to 250 N/mm$^2$, especially from 50 to 150 N/mm$^2$. In addition, graphite supports having a porosity of from, say, 40 to 1% and in particular from 30 to 5%, as measured, for example, by DIN 51,918, give good results.

In general, graphite supports having the least possible ash content, say from 0.001 to 1% w/w, in particular from 0.01 to 0.2% w/w, are used. Examples of suitable types of graphite are electrographites, from which it is not difficult to make an appropriate selection to comply with the above requirements.

The catalysts of the invention are usually made by precipitating platinum from a platinum salt solution on to graphite particles suspended in the solution.

The catalysts of the invention may be used without further additions for hydrogenation reactions. Alternatively, for specific hydrogenations such as the hydrogenation of nitrogen oxide, the catalysts can be used in a partially poisoned state produced, for example, by the addition of poisoning agents such as compounds of sulfur, selenium, tellurium or arsenic. For such purposes, partially poisoned platinum-on-graphite catalysts having a sulfur and/or selenium content of from 3 to 15% atomic, based on platinum, are particularly useful. Examples of selective poisoning agents for use in the manufacture of the catalyst of the invention are sodium dithionite, alkali metal thiosulfates, hydrogen sulfide, alkali metal sulfides, alkali metal polysulfides, thiourea, telluric acid and arsenic acid or combinations thereof.

The preparation usually involves starting from an aqueous solution of hexachloroplatinic acid or tetrachloroplatinic acid or a salt thereof. Compounds used to effect partial poisoning of the catalyst are advantageously added after the solution has been buffered with alkali metal acetate. Metallic platinum is then precipitated onto the graphite support by means of reducing agents capable of reducing the platinum compound to metallic platinum. Examples of suitable reducing agents are hydrazine, formaldehyde and formic acid. The use of formic acid gives particularly good results. For each gram atom of platinum it is advantageous to use from 100 to 1,000 moles of reducing agent. The temperature used during reduction to metallic platinum is advantageously from 60° to 90° C. Following the reduction stage, the suspended catalyst is isolated by filtration and washed, advantageously with water.

The catalysts of the invention are suitable for use in the hydrogenation of organic and inorganic compounds. They are used to advantage in the hydrogenation of olefinically or acetylenically unsaturated compounds and in the hydrogenation of carboxylic acids, aldehydes or ketones to the corresponding alcohols, or of nitriles to the corresponding amines. The catalysts of the invention are also suitable for use in the hydrogenation of inorganic compounds, for example to remove oxygen from gases but especially to prepare hydroxylammonium salts by the hydrogenation of nitrogen oxide in the presence of mineral acids.

In the production of hydroxylammonium salts, the molar ratio of hydrogen to nitrogen oxide is usually kept between 1.5:1 and 6:1. Particularly good results are obtained when the molar ratio of hydrogen to nitrogen oxide in the reaction zone is carefully maintained between 3.5:1 and 5:1.

The acids used are advantageously strong mineral acids such as nitric acid, sulfuric acid and phosphoric acid. Also suitable are acid salts such as ammonium bisulfate. The reaction is usually started using 4N to 6N aqueous acids, and the acid concentration is not allowed to fall below 0.2N during the reaction.

The reaction is advantageously carried out at a temperature of from 30° to 80° C. and a particularly useful temperature range is 35°-80° C. The reaction is normally carried out at atmospheric pressure or an elevated pressure of, say, up to 30 bar.

The platinum-on-graphite catalysts used advantageously have a content of platinum of from 0.2 to 1% w/w. For each liter of dilute mineral acid there will usually be used from 25 to 100 g, preferably 30 to 80 g, of platinum-on-graphite catalyst.

The invention is illustrated below with reference to the following Examples.

COMPARATIVE EXAMPLE (Normal Gauss distribution)

The catalyst support used has the following particle size distribution, as measured with a MALVERN MASTERSIZER S2.01, (distribution by volume):

| | |
|---|---|
| 183 to 600 μm | 3.3% |
| 68.3 to 183 μm | 56% |
| 31.0 to 68.3 μm | 35.8% |
| 17.1 to 31.0 μm | 2.2% |
| 5.2 to 17.1 μm | 1.3% |
| <5.2 μm | 1.4% | a) Preparation of Catalyst 640 g of the above graphite are cleaned twice at room temperature with 10% $HNO_3$, dried and then stirred overnight at 80° C., together with 500 ml of $H_2O$, 100 ml of aqua regia and 8.5 g of hexachloroplatinic(IV) acid.$6H_2O$ (3.2 g of platinum).

The next day, the suspension is diluted with 400 ml of water, cooled to 30° C. and adjusted to a pH of 3.0 with soda, after which the solution is buffered with sodium acetate.$3H_2O$. A solution of sodium dithionate is added until $Pt^{4+}$ is reduced to $Pt^{2+}$, and the Pt is then precipitated onto the graphite support by means of 100 ml of 99% w/w of formic acid.

b) Hydroxylamine Synthesis 200 g (dry substance) of the platinum-on-graphite catalyst thus produced are suspended in 5,000 ml of 20% $H_2SO_4$. Following activation of the catalyst with $H_2$ at 40° C., 240 l/h (STP) of a mixture of 66% v/v of $H_2$ (99.9% pure) and 34% v/v of nitrogen oxide (99.4% pure) is then passed through the said catalyst suspension. The reaction temperature is 40°-41° C.

Following a throughput of 1,875 liters (STP) of said $NO/H_2$ gas mixture, there are obtained 5,280 ml of a hydroxylammonium sulfate solution containing 15.7 g/l of free $H_2SO_4$, 92.0 g/l of $NH_2OH$ [as $(NH_3OH)_2SO_4$] and 15.0 g/l of $NH_3$ (as $NH_4HSO_4$). The total amount of off-gas is 355 l (STP) containing 76.6% v/v of $H_2$, 21.2% v/v of NO and 2.2% v/v of $N_2O$.

Calculations based on the readings give the following results:

Selectivity:
 73.4% for $NH_2OH$
 23.2% for $NH_3$
 3.4% for $N_2O$

Space-time yield:
 0.617 mole/$l_{RR}fl$/h (based on NO)
 0.453 mole/$l_{RR}fl$/h (based on $NH_2OH$).

EXAMPLE 1

Graphite having an asymmetrical particle size distribution a) Preparation of Catalyst The catalyst is prepared as described in the Comparative Example above except that the following graphite having an asymmetrical particle size distribution is used.

| | |
|---|---|
| 183 to 600 μm | 18.5% |
| 68.3 to 183 μm | 35.5% |
| 31.0 to 68.3 μm | 14.3% |
| 17.1 to 31.0 μm | 9.1% |
| 5.2 to 17.1 μm | 15.2% |
| <5.2 μm | 7.3% | b) Hydroxylamine Synthesis

The hydroxylamine synthesis is carried out as described in Example 1 except that the above catalyst is used.

Following a throughput of 1,628 liters (STP) of said $NO/H_2$ gas mixture, there are obtained 5,300 ml of a hydroxylammonium sulfate solution containing 18.6 g/l of free $H_2SO_4$, 94.7 g/l of $NH_2OH$ [as $(NH_3OH)_2SO_4$] and 8.3 g/l of $NH_3$ (as $NH_4HSO_4$). The total amount of off-gas is 263 l (STP) containing 76.3% v/v of $H_2$, 20.7% v/v of NO and 3.0% v/v of $N_2O$. Calculations give the following results:

Selectivity
  82.2% for $NH_2OH$
  14.0% for $NH_3$
  3.8% for $N_2O$

Space-time yields
  0.987 mole/$l_{RR}/l$/h (based on NO)
  0.811 mole/$l_{RR}/l$/h (based on $NH_2OH$).

EXAMPLE 2

Graphite having an asymmetrical particle size distribution a) Preparation of Catalyst

The catalyst is prepared as described in the Comparative Example above except that the graphite used is one having an asymmetrical particle size distribution as follows:

| | |
|---|---|
| 183 to 600 μm | 3.1% |
| 68.3 to 183 μm | 31.5% |
| 31.0 to 68.3 μm | 32.2% |
| 17.1 to 31.0 μm | 16.1% |
| 5.2 to 17.1 μm | 15.3% |
| <5.2 μm | 1.8% | b) Hydroxylamine Synthesis

The hydroxylamine synthesis is carried out as described in the Comparative Example except that the above catalyst is used.

Following a throughput of 1,520 liters (STP) of said $NO/H_2$ gas mixture, there are obtained 5,330 ml of a hydroxylammonium sulfate solution containing 15.9 g/l of free $H_2SO_4$, 99.5 g/l of $NH_2OH$ [as $(NH_3OH)_2SO_4$] and 9.4 g/l of $NH_3$ (as $NH_4HSO_4$). The total amount of off-gas is 304 l (STP) containing 79.9% v/v of $H_2$, 16.1% v/v of NO and 3.8% v/v of $N_2O$. Calculations give the following results:

Selectivity:
  80.2% for $NH_2OH$
  14.7% for $NH_3$
  5.1% for $N_2O$

Space-time yield:
  0.891 mole/$l_{RR}/l$/h (based on NO)
  0.715 mole/$l_{RR}/l$/h (based on $NH_2OH$).

TABLE

| | % Selectivity for | | | Space-time yield [Moles/$l_{RR}/l$/h] | |
|---|---|---|---|---|---|
| | $NH_2OH$ | $NH_3$ | $N_2O$ | based on NO | based on $NH_2OH$ |
| Comp. Ex. | 73.4 | 23.2 | 3.4 | 0.617 | 0.453 |
| Example 1 | 82.2 | 14.0 | 3.8 | 0.987 | 0.811 |
| Example 2 | 80.2 | 14.7 | 5.1 | 0.891 | 0.715 |

We claim:

1. A platinum-on-graphite catalyst having a platinum content of from 0.01 to 5% w/w, wherein the graphite support has a particle size of from 1 to 600 μm and the following particle size distribution:

| | |
|---|---|
| 183 to 600 μm | 15% v/v ± 15% absolute |
| 68.3 to 183 μm | 30% v/v ± 20% |
| 31.0 to 68.3 μm | 25% v/v ± 20% |
| 17.1 to 31.0 μm | 15% v/v ± 10% |
| 5.2 to 17.1 μm | 12% v/v ± 10% |
| <5.2 μm | 5% v/v ± 5%. |

2. A platinum-on-graphite catalyst as claimed in claim 1, wherein the graphite support has an apparent density of from 1.7 to 2.2 g/ml.

3. A platinum-on-graphite catalyst as claimed in claim 1, wherein the graphite support has a compressive strength of from 50 to 250 N/mm$^2$.

4. A platinum-on-graphite catalyst as claimed in claim 1, wherein the graphite support has a porosity of from 1 to 40%.

5. A platinum-on-graphite catalyst as claimed in claim 1, wherein the graphite support has a BET surface area of from 1 to 30 m$^2$/g.

6. A platinum-on-graphite catalyst as claimed in claim 1, wherein the catalyst is partially poisoned with sulfur and/or selenium.

* * * * *